US006065448A

United States Patent [19]

Hatton et al.

[11] Patent Number: 6,065,448

[45] Date of Patent: May 23, 2000

[54] DUAL THROTTLE CONTROL TO A SINGLE THROTTLE INPUT

[75] Inventors: Ray C. Hatton; Dennis O. Taylor, both of Columbus; Eric A. Pyers, Scipio; David L. Clark, Columbus, all of Ind.

[73] Assignee: Cummins Engine Co., Inc., Columbus, Ind.

[21] Appl. No.: 09/122,916

[22] Filed: Jul. 17, 1998

[51] Int. Cl.[7] .............................. B62D 1/12; F02D 11/02

[52] U.S. Cl. .......................... 123/396; 123/399; 180/321

[58] Field of Search .............................. 123/399.14, 361, 123/396, 399, 442; 73/118.1; 180/322, 321, 335; 307/9.1, 10.1; 74/513; 172/2, 3; 414/699

[56] References Cited

U.S. PATENT DOCUMENTS

| | | | |
|---|---|---|---|
| 4,112,885 | 9/1978 | Iwata et al. | 123/98 |
| 4,351,198 | 9/1982 | Hansen | 74/482 |
| 4,540,060 | 9/1985 | Kawata et al. . | |
| 4,612,615 | 9/1986 | Murakami . | |
| 4,892,071 | 1/1990 | Asayama . | |
| 4,898,137 | 2/1990 | Fujita et al. . | |
| 4,912,642 | 3/1990 | Larsen et al. . | |
| 4,944,269 | 7/1990 | Imoehl | 123/399 |
| 5,025,380 | 6/1991 | Wataya et al. . | |
| 5,035,213 | 7/1991 | Pfalzgraf et al. . | |
| 5,105,360 | 4/1992 | Akiyama . | |
| 5,121,728 | 6/1992 | Mausner et al. . | |
| 5,123,389 | 6/1992 | Togai et al. . | |
| 5,429,087 | 7/1995 | Tsujino et al. . | |
| 5,449,956 | 9/1995 | Williams | 307/10.1 |
| 5,520,146 | 5/1996 | Hrovat et al. . | |
| 5,528,500 | 6/1996 | Al-Charif et al. . | |
| 5,532,929 | 7/1996 | Hattori et al. . | |
| 5,575,255 | 11/1996 | Abe et al. . | |
| 5,638,277 | 6/1997 | Nagai . | |
| 5,726,544 | 3/1998 | Lee | 318/271 |

*Primary Examiner*—Tony M. Argenbright
*Assistant Examiner*—Arnold Castro
*Attorney, Agent, or Firm*—Baker & Daniels

[57] ABSTRACT

A dual throttle system for an internal combustion engine includes first foot pedal throttle and a second hand controller throttle. The system includes a throttle position signal generator that produces a throttle position signal at an input to an electronic engine control module (ECM). The engine control module uses the throttle position signal input to determine an engine speed and issues appropriate commands to a fuel system controller. The throttle position generator includes a first potentiometer having its wiper mechanically connected to the first throttle and its output electrically connected to the throttle position signal input of the ECM. The first potentiometer is connected in series between a voltage source in the ECM and the wiper of a second variable resistance component driven by the second throttle. The output of the second component is connected to ground to complete the series circuit. The voltage seen at the throttle signal input of the ECM is a function of the combined series resistances of the potentiometer and the second variable resistance component based upon the positions of the respective throttles.

17 Claims, 2 Drawing Sheets

DUAL THROTTLE CONTROL TO A SINGLE THROTTLE INPUT

BACKGROUND OF THE INVENTION

The present invention is related to throttle controls for an internal combustion engine, such as a diesel engine. Particularly, the invention concerns throttle controls that have two throttle inputs, each manipulatable by an operator to control the speed of the engine.

In engine driven vehicles, a throttle is manipulated by the vehicle operator to control the speed of the engine, and consequently the speed of the vehicle. In most vehicles, the throttle is in the form of an accelerator foot pedal mounted in the cab of the vehicle. In other applications, the throttle can be a hand throttle, such as the type found on motorcycles. Hand throttles are also used in certain industrial applications, such as hoisting cranes and other heavy-duty industrial machines. In these industrial applications, the engine may drive the machine, such as for a movable crane, as well as a power take-off unit, such as a crane winch.

In recent years, electronic controls have replaced mechanical devices for controlling the operation of the engine. Rather than the direct throttle linkage to a butterfly valve, industrial engines are controlled by more sophisticated engine control modules. These engine control modules, or ECMs, continuously monitor the state of various inputs and apply these inputs to engine control algorithms implemented by on-board microprocessors or computers. One such system for is depicted in FIG. 1. An engine 10 includes a fuel system 12 that controls the intake of air and/or fuel to the various engine cylinders. For example, in a spark ignition engine, the fuel system 12 can include fuel injectors and throttle valves that control the amount of air fed to the engine for combustion. In a typical diesel engine, the fuel system 12 comprises a fuel injector array that controls the amount of diesel fuel introduced into each cylinder. With either type of engine, the speed of the engine 10 is governed by the amount of fuel admitted to the engine cylinders.

The engine speed can be controlled by the operator by way of a throttle 15, which can take the form of a foot pedal or a hand control as described above. In lieu of the direct mechanical linkage to the fuel system, a throttle position signal generator 17 is connected to the throttle 15 to generate a signal in relation to and indicative of the position of the throttle. Typically, the throttle position signal 23 produced by the signal generator 17 is a voltage that increases as the throttle position is increased from an idle position. In the case of a foot pedal, the voltage increases as the pedal is depressed.

The throttle position signal 23 is supplied to an engine control module (ECM) 20, and specifically to a throttle controller 22 within the ECM. In addition to the throttle position signal, the ECM 20 receives signals 26 from various vehicle operating condition sensors 25. These sensors can measure engine parameters, such as exhaust temperature, inlet air pressure, oil pressure and the like, as well as vehicle performance parameters, such as wheel slip. The sensor signals 26 are received by the ECM 20 and used by the throttle controller 22 to derive a signal or signals 27 indicative of a desired engine speed. These signals 27 are fed to an engine speed controller 28 that drives appropriate elements of the fuel system 12. For example, in a diesel engine, the fuel system 12 can include the fuel injector rack, and the engine speed controller 28 can comprise motors driving the injector rack.

Details of a typical throttle system are depicted in FIG. 2. In certain throttle systems, the throttle controller 22 can include an indicator circuit 29 that generates signals indicative of whether the throttle 15 is in a released or a fully depressed position. In throttle systems contemplated by the present invention, the throttle position signal generator 17 includes a potentiometer 30. The potentiometer 30 can be of known design including a resistance element 31 and a wiper 33. The wiper 33 is mechanically connected to the throttle 15 by way of a linkage 35 so that the wiper traverses the resistance element 31 as the throttle is manipulated. A voltage +V is applied at the input to the resistance element 31. The output of the wiper 33 is connected to the throttle signal input 23 to the ECM and throttle controller 22. The throttle signal input 23 is fed to a conditioning circuit 37 so that a voltage is seen at the position signal input 39 that correlates to the throttle position, and ultimately to a requested engine speed. The voltage seen at the position signal input 39 is converted within the throttle controller 22 to a signal usable by the algorithms implemented by the ECM 20 and controller 22.

As mentioned above, certain industrial engine applications utilize a hand controller for an engine throttle control. In many of these applications, both the foot pedal and the hand controller are utilized. Arrangements of this form are typical in construction and agricultural equipment in which the engine drives various power take-off units in addition to the vehicle itself. Prior dual throttle arrangements rely upon the operator to select which throttle input is being used to control the engine speed. One such system is shown in FIG. 3. In this system, two throttles 40, 42 are provided, with one of the throttles constituting a foot pedal and the other a hand controller. Each throttle 40, 42 has its own throttle position signal generator in the form of a separate variable resistance element. Thus, the throttle 40 controls a wiper 45 across a resistance element 44, while the throttle 42 drives wiper 47 along resistance element 46. Both resistance elements are connected a voltage source +V and to a common ground. In this system, an operatormanipulated switch 50 is connected at the throttle signal input 52 that feeds the throttle position signal to the ECM. The switch 50 is movable between node 54 connected to wiper 45 of the first throttle 40, and node 55 connected to wiper 47 of the second throttle 46. With this system, only one throttle provides a voltage signal to the ECM, depending upon the position of switch 50.

While the system depicted in FIG. 3 accommodates the need for multiple throttles in industrial and agricultural applications, it suffers from certain drawbacks. First, the operator must toggle switch 50 to select one of the first and second throttles 40, 42. The switch 50 is a further component that may be subject to deterioration or damage, and may have its performance compromised by vibration or temperature in the vehicle cab.

Most significantly, in dual throttle systems of this type a lag is introduced while the operator switches between throttles. When switching between throttles the operator cannot determine the proper throttle position for the second throttle to match the throttle position of the first throttle. In these circumstances, the operator must release the first throttle 40, flip the switch 50 and then depress the second throttle 42. The operator must then attempt to match the engine speed by depressing the second throttle an appropriate amount. Inevitably, these steps lead to a momentary reduction in engine speed, often followed by over-revving the engine.

SUMMARY OF THE INVENTION

In view of the drawbacks of the prior dual throttle systems, the present invention contemplates a dual throttle system in which the throttles are arranged in series. The throttle system of this invention eliminates the need to manually select one of the throttles for input to an engine control module. In the preferred embodiment, a first throttle is linked to a first throttle position signal generator, and specifically to a component of a variable resistance element, such as the wiper of a first potentiometer. Voltage across the first wiper is determined by the position along the potentiometer resistance element. A second throttle is linked to a second throttle position signal generator, and specifically to the wiper of a second potentiometer or variable resistance element.

The resistance element of the second potentiometer is connected to ground only. In accordance with one feature of the invention, the wiper of the second potentiometer is connected in series with the resistance element of the first potentiometer. Voltage input to the circuit is applied at the first potentiometer. The wiper of the first potentiometer is connected to the throttle signal input to the engine control module and throttle controller. Thus, the voltage seen at the throttle signal input is based on the combined positions of the two throttles, and ultimately on the combined resistance values of the series connected potentiometers.

In one aspect of the present invention, the series connected throttle position signal generators provide a means for one throttle to, in effect, supplement the signal from the other throttle. Thus, a change in throttle position of the first throttle will be registered by the ECM, regardless of the position of the second throttle. The present invention provides the further ability for the operator to set one throttle in a given position and then increase that corresponding engine speed by application of the second throttle, all without interruption, reduction or fluctuation of the engine speed.

It is one object of the present invention to provide a system for uninterrupted use of dual throttles to control the speed of an internal combustion engine. A further object resides in features of the invention that allow integration of the dual throttle system into an existing electronic engine control system without modification.

Another object of the invention is realized by providing direct connection between the throttles to eliminate intermediate switching mechanisms. Other object and certain benefits of the present invention will become apparent upon consideration of the following written description and accompanying figures.

DESCRIPTION OF THE PREFERRED EMBODIMENT

Figure 1:
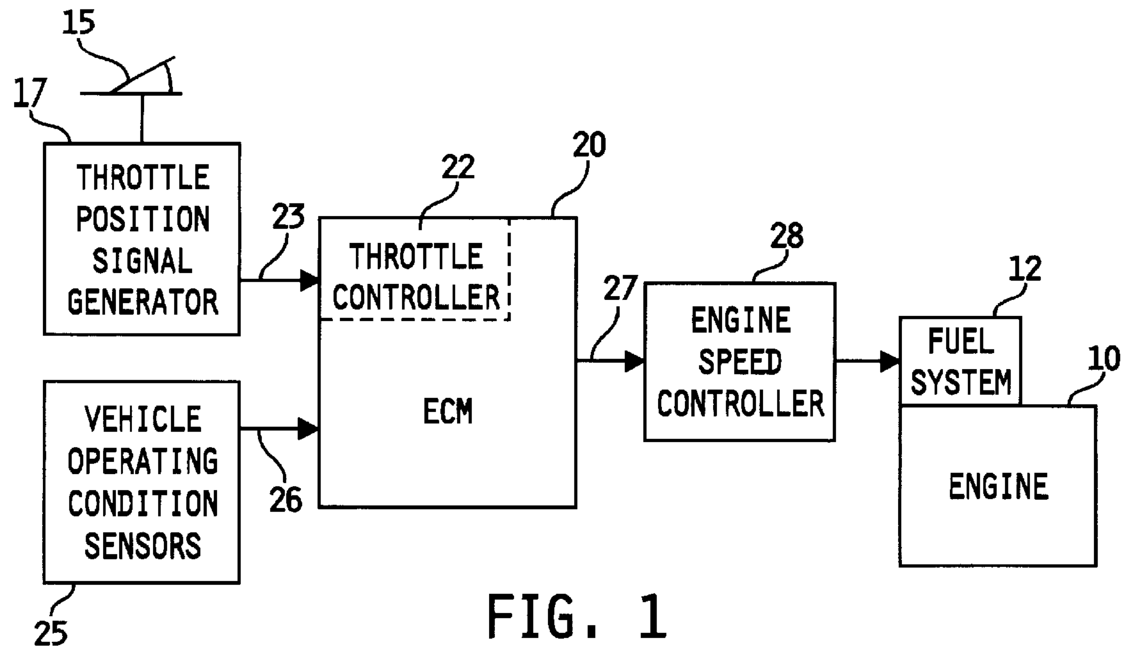
FIG. 1 is a schematic representation of a throttle system for controlling an internal combustion engine.
Figure 2:
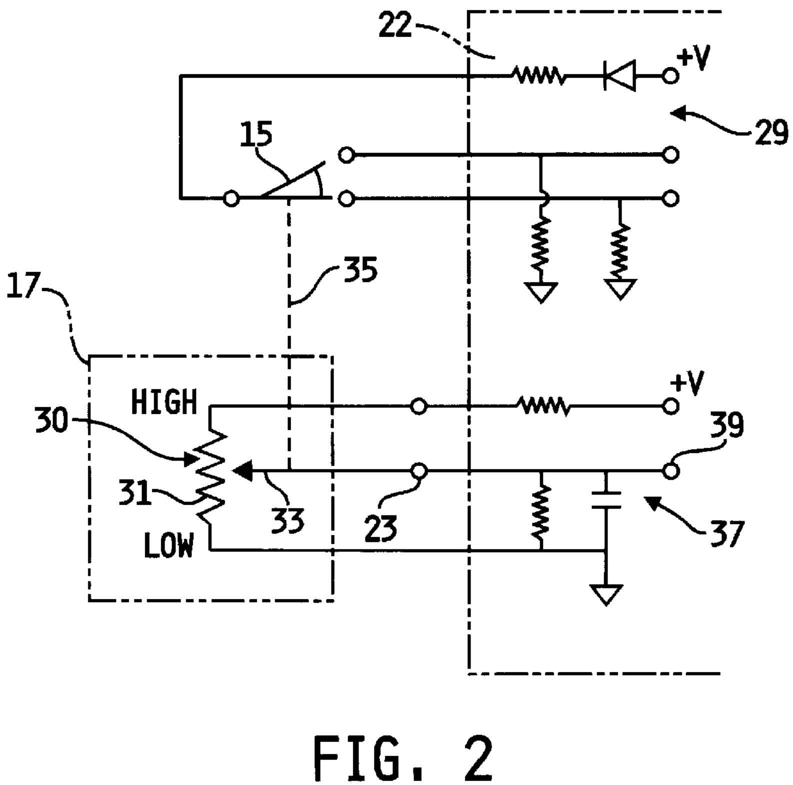
FIG. 2 (PRIOR ART)
FIG. 2 is a schematic of circuitry for the throttle system depicted in FIG. 1.
Figure 3:
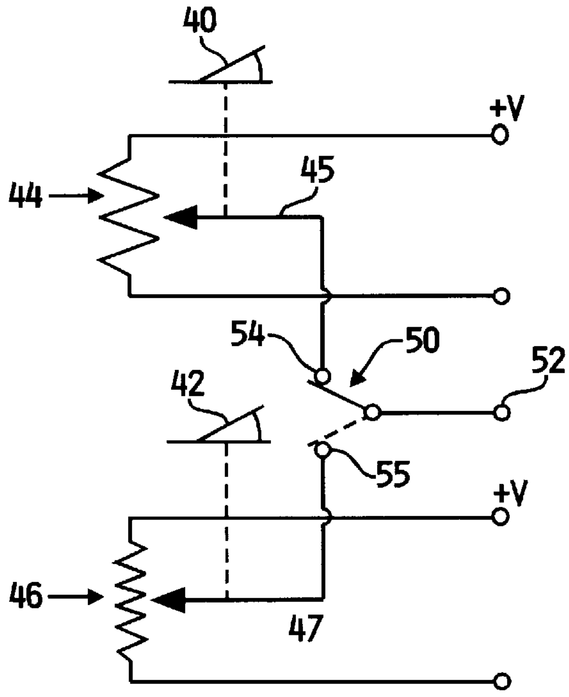
FIG. 3 (PRIOR ART)
FIG. 3 is a schematic of circuitry for a dual throttle system of the prior art.

For the purposes of promoting an understanding of the principles of the present invention, reference will now be made to the embodiment illustrated in the drawings and described herein. It is understood that no limitation of the scope of the invention is intended by the specific figures and description. Alterations and modifications of the illustrated system and method as would occur to persons of ordinary skill in the art are contemplated.

The present invention concerns a dual throttle system for controlling the speed of an internal combustion engine. The invention is particularly adapted for providing a throttle position signal to an engine control module, such as ECM 20 illustrated in FIG. 1, which then generates engine speed control signals 27 to direct the operation of an engine speed controller 28. In the illustrated embodiment, the engine 10 being controlled is a diesel engine and the fuel system 12 comprises the fuel injector rack. However, it is understood that the dual throttle system of the invention can be utilized to control the speed of a spark ignition engine.

Furthermore, the preferred embodiment of the invention is directed to a dual throttle system in which one throttle is a traditional foot pedal, while the other throttle is a hand controller. Of course, the inventive system can be implemented with any type of throttle controller that can generate a desired throttle or engine speed signal in relation to input from the equipment or vehicle operator. Likewise, the dual throttle system can be used in a wide range of vehicles or equipment, ranging from a construction crane, to an agricultural vehicle, to other forms of vehicles, particularly offroad vehicles.

In accordance with the preferred embodiment, the dual throttle system of the present invention includes a first throttle 60 that is preferably the principal throttle for the vehicle. Typically, the first throttle 60 will constitute a foot pedal throttle or accelerator in the vehicle cab. A second throttle 62 is also provided that can take the form of a hand controller in the preferred embodiment. Both throttles 60 and 62 can be of conventional design, or of more sophisticated designs in which the throttles can be retained in a plurality of throttle positions.

Both throttles 60, 62 are linked to a common throttle position signal generator 65 that produces a throttle position signal 70. The throttle position signal 70 is supplied to a throttle controller 67 that forms part of an electronic engine control module. The throttle controller 67 includes a signal conditioning circuit applied to the throttle position signal 70 to produce a signal usable by the controller 67. In this respect, the throttles 60, 62, position signal 70 and throttle controller 67 are substantially similar to the like named components described with reference to FIG. 1. The dual throttle system of the present invention presents the same "look" to the ECM 20 as the single throttle system described above. Industry and company standards generally dictate requirements or specifications for the interface between a throttle and the engine control system. The dual throttle system of the present invention meets these requirements so that the inventive system can be readily substituted for an existing throttle system.

While the throttle position signal generator 65 generates a single position signal 70 like the prior single and dual throttle systems, it does so in a very different manner. In accordance with the invention, the signal generator 65 includes a first variable resistance component 72. In the preferred embodiment, the first resistance component 72 is a potentiometer that includes a resistance element 73 and a movable wiper 74. The wiper 74 is connected to the first throttle 60 by a linkage 76. The potentiometer 72 and linkage 76 can be of conventional design.

The second throttle 62 operates on a second variable resistance component 80. In one specific embodiment, the second resistance component 80 is a variable resistance element having a second resistance element 81 and a wiper 82. The wipers 74, 82 of the first and second variable resistance components 72, 80, respectively, traverse the corresponding resistance elements 73, 81 between one end corresponding to a high engine speed position and the opposite end corresponding to a low speed or idle position. Again, in this respect the two variable resistance elements act as similar components of a typical single throttle system.

In accordance with the present invention, the input to the first throttle potentiometer 72 is connected to the voltage source +V of the ECM 20 or throttle control module 67. The output of the potentiometer 72 is connected to the wiper 82 of the second variable resistance component 80. The variable resistance element 81 of the second component 80 is unconnected at its input, or high throttle position end, and is connected to ground at its output or low throttle position end. Thus, the potentiometer 72 and variable resistance element 80 are connected in series with the throttle controller 67 and its voltage source +V.

IN a further important feature of the invention, the wiper 74 of the first potentionmeter 72 is connected to the throttle signal input 70 at the ECM. As each of the throttles 60, 62 are depressed, the respective first and second wipers 74, 82 provide a variable restistance along the series circuit. The resistance value contributed by the first and second resistance components 72,80 then depends upon the position of the corresponding throttle. The combined resistances at the two components yield a voltage across the throttle signal input 70 that varies simultaneously with variable positions of both throttles 60, 62.

Figure 4:
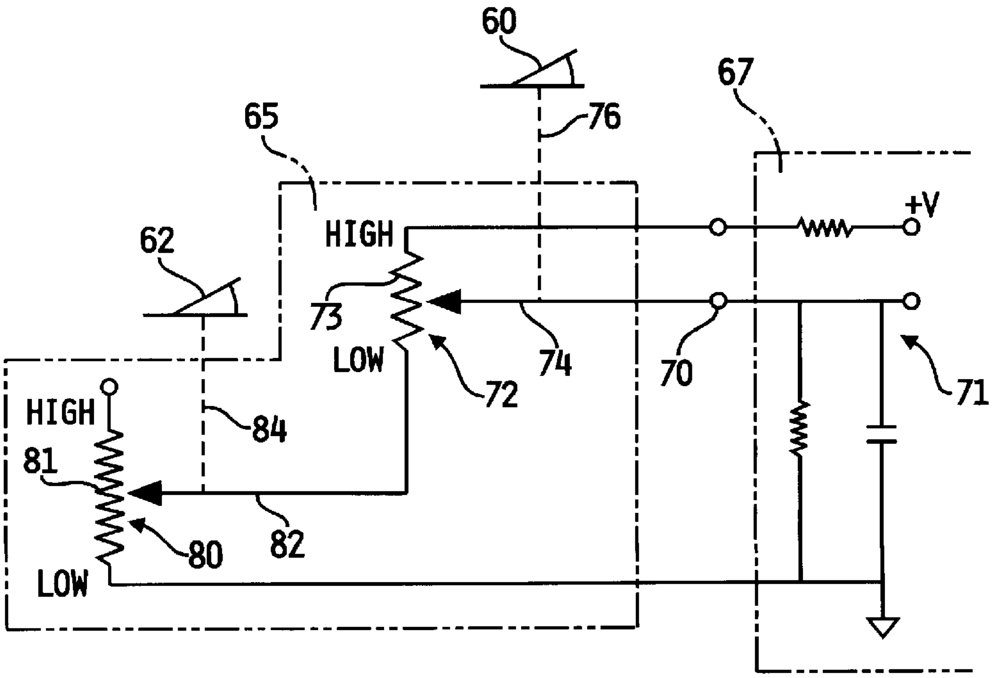
FIG. 4 is a schematic of circuitry for a dual throttle system according to the preferred embodiment of the present invention.

In this manner, one throttle can override the other throttle to produce a change in throttle signal 70 provided to the throttle controller. Either throttle can be operated without any gap in throttle signal input to the ECM 20. Moreover, one throttle can be set in a given position corresponding to a minimum engine speed, while the other throttle can be used in increase or decrease the engine speed, depending upon its inital position. Either wiper 74, 82 can be biased to a particular position depending upon the configuration of the throttle. For example, the wipers can be biased to a midpoint position, as depicted in FIG. 4 if an appropriately configured throttle is utilized than can move the wiper above or below the midpoint position.

In a specific embodiment, the potentiometer 72 driven by the first throttle 60 (foot pedal) is calibrated to provide for gross throttle adjustement relative to the variable restistance element 80 driven by the second throttle 62 (hand controller). In this embodiment, the first variable resistance component 72 is a 2.5 kΩ potentiometer, while the second variable resistance component 80 is a 0–5 kΩ variable resistance element. While both variable resistance components have a similar resistance range, variations at the first component 72 produce greater voltage changes across the throttle signal input 70 than variations at the second component 80.

Moreover, in the specific embodiment, the second throttle operates a variable resistance element with a higher minimum resistance value than the potentiometer of the first throttle. Variations at the second throttle variable resistance element 80 will cause changes in the current through the series circuit because the wiper 82 provides the series connection. In contrast, the entire resistance of the potentiometer 72 is disposed within the series circuit so changes in wiper 74 position do not cause changes in the circuit current. Most ECM protocols strictly limit the current seen by the ECM at its inputs. Consequently, the potentiometer 72 maintains the circuit current within the ECM restrictions. The variable resistance element at the second throttle 62 should not become exceedingly large so as to lower the current to such a point that contact resistances of the wiper or external electrical connections become a source of signal error.

In a specific embodiment, the potentiometer 72 and variable resistance element 80 constitute a 2:1 resistance ratio. When the minimum position for the first throttle and potentiometer and the full throttle position for the element 80 is maintained, the voltage at the ECM input 70 will reach approximately 67% of the applied voltage +V, allowing fill throttle capability through the second throttle 62. In this embodiment, the minimum position resistance for the potentiometer can be 2.5 kΩ and the maximum position resistance of the variable resistance element can be 5.0 kΩ.

In this same specific embodiment, the low end resistance values of the potentiometer and variable resistance element are calibrated so that the voltage drop across these elements does not exceed 10% or fall below 3% of the applied voltage +V in order to obtain a low idle condition and meet ECM diagnostic limits. At the other end of the spectrum, the voltage drop across the combined resistance in the maximum position for both elements should not exceed 90% of +V to permit application of certain diagnostic routines.

While the preferred embodiment of the invention has been illustrated and described in detail in the figures and accompanying specification, this description is not intended to be restrictive in character. Instead, it is understood that the present invention contemplates changes and modifications to the illustrated embodiments that may arise on consideration by a person of ordinary skill in the art to which this invention pertains. For example, the two variable resistance components can be of many forms that are capable of providing variable resistance values across the series circuit of the inventive throttle control. In addition, the resistance ranges of the elements, as well as the relative resistance values between the elements, can be varied as necessary to mate with various engine control systems, ECMs and control circuitry.

What is claim is:

1. A dual throttle control system for controlling the speed of an internal combustion engine having an engine control module (ECM), the module having a voltage source and a throttle position signal input in which the ECM implements algorithms that control engine speed as a function of the throttle position signal received at the input, the system comprising:

a first throttle manipulatable by an operator;

a second throttle manipulatable by the operator and separate from said first throttle;

a throttle position signal generator connected between said first and second throttles and the input to the ECM, said signal generator including;

a first variable resistance component having a first resistance element and a first wiper element, said first wiper element electrically connected to the throttle position signal input of the ECM;

first means connecting said first throttle to said first wiper element so that movement of said first throttle produces variable electrical connection between said first wiper element and said first resistance element;

a second variable resistance component having a second variable resistance element and a second wiper; and second means connecting said second throttle to said second wiper element so that movement of said second throttle produces variable electrical connection between said second wiper element and said first resistance element;

wherein said first variable resistance element is connected in series between the voltage source of the ECM and the second wiper element, and said second variable resistance element is connected at one end to ground and not electrically connected at its opposite end.

2. The dual throttle system according to claim 1, wherein said second variable resistance component is a variable resistor.

3. The dual throttle system according to claim 1, wherein said first variable resistance component is a potentiometer.

4. The dual throttle system according to claim 3, wherein said second variable resistance component is a variable resistor.

5. The dual throttle system according to claim 1, wherein said first variable resistance component has a non-zero ohm minimum resistance.

6. The dual throttle system according to claim 5, wherein said second variable resistance component has a non-zero minimum resistance value.

7. The dual throttle system according to claim 6, wherein said first variable resistance component has a first maximum resistance value and said second variable resistance component has a second minimum resistance value at least two times said first maximum resistance value.

8. The dual throttle system according to claim 7, wherein said first maximum resistance value is 2.5 kΩ and said second minimum resistance value is about 5 kΩ.

9. The dual throttle system according to claim 1, wherein said first throttle includes a foot pedal.

10. The dual throttle system according to claim 9, wherein said second throttle includes a hand controller.

11. The dual throttle system according to claim 1, wherein said first variable resistance component has a first minimum resistance value when said first throttle is at an engine low idle position, and said second variable resistance component has a second maximum resistance value when said second throttle is at an engine full throttle position, said second maximum resistance being at least twice said first maximum resistance value.

12. The dual throttle system according to claim 11, wherein said first minimum resistance value and said second maximum resistance value are calibrated so that the voltage drop across said first variable resistance component at said first minimum resistance value and said second variable resistance component at said second maximum resistance value is approximately two-thirds of the voltage from the voltage source.

13. The dual throttle system according to claim 1, wherein said first variable resistance component has a first minimum resistance value when said first throttle is at an engine low idle position, and said second variable resistance component has a second minimum resistance value when said second throttle is at an engine low idle position, said first and second minimum resistance values being calibrated so that the voltage drop across said resistance components does not exceed approximately ten percent of the voltage from the voltage source.

14. The dual throttle system according to claim 1, wherein said first variable resistance component has a first maximum resistance value when said first throttle is at an engine full throttle position, and said second variable resistance component has a second maximum resistance value when said second throttle is at an engine full throttle position, said first and second maximum resistance values being calibrated so that the voltage drop across said resistance components does not exceed approximately ninety percent of the voltage from the voltage source.

15. A dual throttle control system for controlling the speed of an internal combustion engine having an engine control module (ECM), the module having a voltage source and a throttle position signal input in which the ECM implements algorithms that control engine speed as a function of the throttle position signal received at the input, the system comprising:

a first throttle manipulatable by an operator;

a second throttle manipulatable by the operator and separate from said first throttle;

a throttle position signal generator connected between said first and second throttles and the input to the ECM, said signal generator including;

a first variable resistance component having a first resistance element and a variable resistance output electrically connected to the throttle position signal input of the ECM and adjustable relative to said first resistance element to produce a first variable resistance value;

first means connecting said first throttle to said first variable resistance component so that movement of said first throttle produces said first variable resistance value;

a second variable resistance component having a second resistance element and a conducting member adjustable relative to said second resistance element to produce a second variable resistance value;

second means connecting said second throttle to said second variable resistance component so that movement of said second throttle produces said second variable resistance value;

wherein said first variable resistance element is connected in series between the voltage source of the ECM and said conducting member, and said second variable resistance element is connected at one end to ground and not electrically connected at its opposite end.

16. The dual throttle system according to claim 15, wherein said second variable resistance component is a variable resistor and said conducting member is an electrical wiper.

17. The dual throttle system according to claim 15, wherein said first variable resistance component is a potentiometer.

* * * * *

UNITED STATES PATENT AND TRADEMARK OFFICE
CERTIFICATE OF CORRECTION

PATENT NO. : 6,065,448 
DATED : May 23, 2000
INVENTOR(S) : Ray C. Hatton; Dennis O. Taylor; Eric A. Pyers; David L. Clark It is certified that error appears in the above-identified patent and that said Letters Patent is hereby corrected as shown below:

Column 5,
Line 36, replace "in" with -- to --
Line 45, Replace "adjustement" with -- adjustment --

Column 6,
Line 11, replace "fill" with -- full --
Line 40, replace "claim" with -- claimed --
Line 41, delete "control"

Column 7,
Line 5, delete "of the ECM"
Line 6, delete ", and second variable resistance element is connected at one end to ground and not electrically connected at its opposite end."

Column 8,
Line 14, delete "control"
Line 46, delete "of the ECM"

UNITED STATES PATENT AND TRADEMARK OFFICE

CERTIFICATE OF CORRECTION

PATENT NO. : 6,065,448 
DATED : May 23, 2000
INVENTOR(S) : Ray C. Hatton; Dennis O. Taylor; Eric A. Pyers; David L. Clark It is certified that error appears in the above-identified patent and that said Letters Patent is hereby corrected as shown below:

Column 8, (Continued)
Line 47, delete ", and said second variable resistance element is connected at one end to ground and not electrically connected at its opposite end."

Please add the following as new claims 18 and 19:
-- 18. The dual throttle system according to claim 1, wherein said second variable resistance element is connected at one end to ground and not electrically connected at its opposite end. --
-- 19. The dual throttle system according to claim 15, wherein said second variable reistance element is connected at one end to ground and not electrically connected at its opposite end.--

Signed and Sealed this

Seventh Day of August, 2001

*Attest:*

Nicholas P. Godici

NICHOLAS P. GODICI

*Attesting Officer* *Acting Director of the United States Patent and Trademark Office*